(12) United States Patent
Saito et al.

(10) Patent No.: US 6,243,018 B1
(45) Date of Patent: Jun. 5, 2001

(54) APPARATUS FOR MULTIPLEXING BETWEEN ON-BOARD UNITS IN A VEHICLE

(75) Inventors: Hiroyuki Saito; Mitsuru Koni, both of Hitachinaka (JP)

(73) Assignees: Hitachi, Ltd., Tokyo; Hitachi Car Engineering Co., Ltd., Hitachinaka, both of (JP)

( * ) Notice: Subject to any disclaimer, the term of this patent is extended or adjusted under 35 U.S.C. 154(b) by 0 days.

(21) Appl. No.: 09/325,648

(22) Filed: Jun. 4, 1999

Related U.S. Application Data

(63) Continuation of application No. 08/604,613, filed on Feb. 21, 1996, now Pat. No. 6,020,811.

(30) Foreign Application Priority Data

Feb. 21, 1995 (JP) ...................................... 7-32647

(51) Int. Cl.$^7$ .................................................. G08B 21/00
(52) U.S. Cl. ........................ 340/650; 340/438; 340/638; 340/825.06; 340/517
(58) Field of Search ..................... 340/596, 597, 340/598, 599, 647, 505, 517, 508, 578, 500, 501, 650, 649, 651, 638, 825.06; 375/257; 364/424.045, 424.04, 424.054; 324/500, 509

(56) References Cited

U.S. PATENT DOCUMENTS

| | | | |
|---|---|---|---|
| 2,787,784 | * | 4/1957 | Meryman et al. .................... 340/526 |
| 4,859,989 | * | 8/1989 | McPherson .......................... 340/510 |
| 5,534,848 | * | 7/1996 | Steele et al. ......................... 340/517 |

FOREIGN PATENT DOCUMENTS 4-17809    3/1992 (JP) .

\* cited by examiner

*Primary Examiner*—Daryl Pope
(74) *Attorney, Agent, or Firm*—Evenson, McKeown, Edwards & Lenahan, P.L.L.C.

(57) ABSTRACT

A multiplexing apparatus multiplexes between processing units and a battery unit of a vehicle which are connected to one another by wire harnesses, by grouping a variety of on-board controlled objects into a plurality of neighboring controlled objects and controlling each of respective processing units. The wire harness has electric conductors of which the outer peripheral portion are covered with a first insulating layer, electric conductivity layer which covers the electric conductors, a second insulating the peripheral portion of the electric layer which covers conductivity layer, means for applying an electric potential to said electric conductivity layer, and means for monitoring the electric potential of said electric conductivity layer.

15 Claims, 14 Drawing Sheets

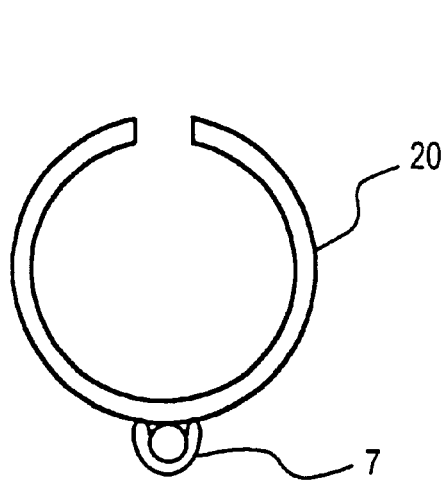
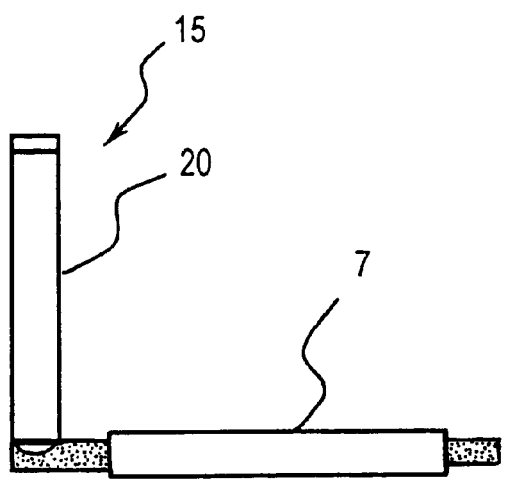
FIG. 7a  FIG. 7b
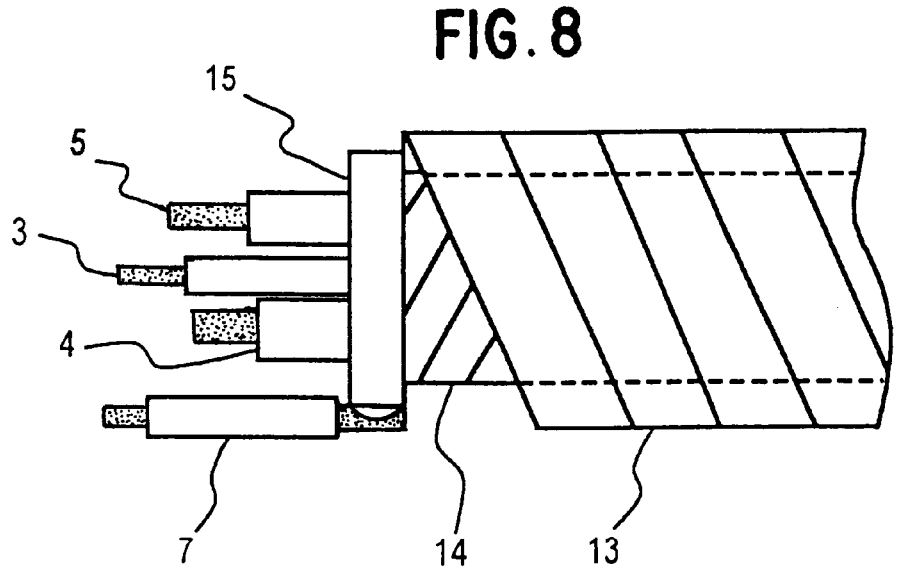
FIG. 8

FIG . 18

| PLACE OF OCCURRENCE | 109 | 108 | 107 | 106 |
|---|---|---|---|---|
| POINTS | 20 | 10 | 5 | 1 |

| FREQUENCY OF OCCURRENCE | MORE THAN ONE PER DAY | MORE THAN ONE PER HOUR | MORE THAN ONE PER MINUTE | MORE THAN ONE PER SECOND |
|---|---|---|---|---|
| POINTS | 1 | 5 | 10 | 20 |

| INPORTANCE | ADD-ON FUNCTION COMPONENTS | PROTECTIVE FUNCTION COMPONENTS |
|---|---|---|
| POINTS | 1 | 10 |

| TOTAL POINTS | MORE THAN 5 | MORE THAN 15 | MORE THAN 20 | MORE THAN 40 |
|---|---|---|---|---|
| EMERGENCY | LEVEL 1 | LEVEL 2 | LEVEL 3 | LEVEL 4 |

APPARATUS FOR MULTIPLEXING BETWEEN ON-BOARD UNITS IN A VEHICLE

This application is a continuation of application Ser. No. 08/604,613, filed Jan. 23, 1998, which is a continuation of Ser. No. 08/604,613, filed Feb. 21, 1996.

BACKGROUND OF THE INVENTION

The present invention relates to an apparatus for multiplexing between on-board units of a vehicle by using wire harnesses.

Recently, various controls in a vehicle are performed by an on-board computer and the associated electrically controlled equipments. Thus, large amounts of electric wiring are used in the vehicle. The electric wiring, such as the wire harnesses, have the potential for causing a short-circuit. Therefor, various apparatus for detecting the short-circuit of wire harnesses for power supply have been proposed in the past.

One of them is disclosed in Japanese Patent publication No. 4-17809 (1992), in which the rated consumption currents for respective loads are calculated in advance, the occurrence of an abnormality due to the short-circuit is detected by comparing the sum of the rated consumption currents with the sum of the current one in the vehicle.

However, when a wire harness is installed into a vehicle body, the harness may be jammed into the vehicle body and/or the coating of the harness may be broken due to the rubbing of the harness on metal portions of the vehicle body. Therefore, a core wire of an electric power source may short to a ground portion of the vehicle body, and thus serious accidents such as a fire in the vehicle may break out in the worst case.

In the above prior art, the apparatus is constructed such that the serious accidents can be prevented immediately by cutting off the whole current. Therefore, when such accidents occur during driving, a power source is cut off. As a result, the vehicle stops suddenly. Further, when the driver changes the load of an electric system, it is required to change the predetermined rated value. Therefore, there was a possibility that a malfunction would occur. In addition, while the short-circuit of the wire harness can be detected, the processing after the detection of the short-circuit can not be performed.

SUMMARY OF THE INVENTION

An object of the present invention is to provide an apparatus for multiplexing between on-board units of a vehicle, which apparatus can detect at an early stage the short-circuit of the wire harness.

Another object of the present invention is to provide an apparatus for multiplexing between on-board units of a vehicle, which apparatus can perform a suitable processing when the short-circuit of the wire harness is detected, thereby the serious accident can be prevented in advance.

In order to achieve the above objects, an electric conductivity layer is provided outside the electric wires, and the predetermined electric potential is provided to the electric conductivity layer. Further, the outside of the electric conductivity layer is covered with an insulator layer. As a result, a sub-wire harness is formed as a whole. The wire harness in the whole vehicle is constructed by connecting the sub-wire harnesses to each other by a connector. The multiplexing apparatus includes, besides a monitor for monitoring an electric potential of the wire harness and detecting a short-circuit to the ground, a control system for determining the short-circuit on the basis of the result of the detection by the monitor, and an alarm raising system for raising an alarm according to a command from the control system, and a circuit breaker to break the current from a power source.

According to one aspect of the present invention, the multiplexing apparatus multiplexes between processing units and a battery unit of a vehicle which are connected to one another by wire harnesses, by grouping a variety of on-board controlled objects into a plurality of neighboring controlled objects and controlling each of the groups by respective processing units. The wire harness has electric conductors of which the outer peripheral portion are covered with a first insulating layer, electric conductivity layer which covers the electric conductors, a second insulating layer which covers the peripheral portion of the electric conductivity layer, device for applying an electric potential to said electric conductivity layer, and a monitor the electric potential of said electric conductivity layer.

Preferably, the electric conductivity layer is formed by a thin mesh wire.

The multiplexing apparatus according to the present invention further may include an alarm for raising an alarm to a driver, and a control system for starting up the alarm to raise the alarm.

In addition to the alarm and the control system, the multiplexing apparatus further may include a power source circuit breaker for cutting off a current supplied from the battery unit, wherein said control system start up said power source circuit breaker to cut off the current from the battery, when said electric conductivity layer is short-circuited to the ground.

In the multiplexing apparatus according to the present invention, there may be provided a plurality of electric conductivity layers between which insulating layers are sandwiched alternately.

Preferably, the multiplexing apparatus further may include an alarm for raising an alarm to a driver, a power source circuit breaker for cutting off a current supplied from the battery unit, and a control system for starting up said alarm to raise the alarm and starting up said power source circuit breaker to cut off the current from the battery unit, when at least one of said electric conductivity layers is short-circuited to the ground.

Preferably, the multiplexing apparatus further include a device for applying an electric potential to said electric conductivity layer, a monitor the electric potential of said electric conductivity layer between respective groups, a detector for detecting the short-circuit of the wire harness to the ground on the basis of the output of said monitor, and a circuit breaker for cutting off a current passing through said electric conductor from the power source when the short-circuit of the wire harness to the ground is detected by said detector.

The above multiplexing apparatus further may include a data storage for storing the data used to estimate the damage by using at least one of the frequency of the short-circuit of the wire harness to the ground, the term of time of the short-circuit, the position of the short-circuit and the importance as parameters, and a control system for setting the condition of cut-off of the circuit breaker on the basis of the data stored in the data storage.

Preferably, the multiplexing apparatus according to the present invention further includes a device for applying an electric potential to said electric conductivity layer, a monitor for the electric potential of said electric conductivity layer between respective processing units, a detector for the short-circuit of the wire harness to the ground on the basis of the output of said monitor, and an alarm for raising the alarm to a driver when the short-circuit of the wire harness to the ground is detected by said detector.

In the multiplexing apparatus described above, the electric potential applying device preferably include a C-shaped electric conductivity body a portion of which is notched, an electric conductor connected to the electric conductivity body, for detecting an electric potential, and a pull-up resistor, and wherein said electric conductivity body is press-bonded to the electric conductor from the outside of the electric conductivity layer of the thin mesh wire.

It is desirable to provide data storage for storing the data used to estimate the damage by using at least one of the frequency of the short-circuit of the wire harness to the ground, the term of time of the short-circuit, the position of the short-circuit and the importance as parameters, and a control system for changing a alarm level of the alarm on the basis of the data stored in the data storage.

Further, the power source cut-off preferably includes a switching element.

The multiplexing apparatus according to the present invention further may include a fail-safe device which allows the processing unit in charge of the group of the area where the abnormality occurred to notify the occurrence of the abnormality to a processing unit of another group when said wire harness becomes abnormal, cut away the abnormal area and leave the control to the processing unit of another group.

Preferably, in the multiplexing apparatus according to the present invention, the processing units include a terminal processing unit which performs only the processing at the associated group, and a control unit which performs all the processing including the processing of the terminal processing unit.

In operation, the outermost insulating layer of the wire harness functions as a protecting layer, and it prevents the power source line from the ground-short. When the insulating layer is broken and it reaches the electric conductivity layer, the electric potential of the electric conductivity layer changes. Therefore, it is possible to determine the presence or absence of the short-circuit by detecting the change. When the short-circuit is detected, it becomes possible to perform the predetermined processing by the processing unit in charge of the group to which the short-circuited wire harness belongs. Because the electric conductivity layer is formed by a thin wire mesh, there is not almost the fear of disconnection due to external force. It is, therefore, possible to maintain stable performance.

More practically, the control system starts up the alarm when the electric conductivity layer is short-circuited to the ground, and thus the alarm is raised. As a result, it is possible to alert the driver.

Further, the control system starts up the power source circuit breaker when the electric conductivity layer is short-circuited to the ground, and thus a current from the power source is cut off. As a result, it is possible to prevent a vehicle fire due to the short-circuit.

Furthermore, because a plurality of electric conductivity layers are provided for the detection of a short-circuit, the control system determines whether only an alarm is raised or the power source is also cut off in addition to the alarm. Therefore, it is possible to take a suitable counter-measure according to the position where the short-circuit occurs.

Further, the monitor monitors the electric potential applied to the conductivity layer, and the detector detects the short-circuit of the wire harness to the ground on the basis of an output of the monitor. When the detector detects the ground-short, the circuit breaker cuts off the power source. At that time, the control system grasps the state of the ground-short from data to estimate damage by using the parameters of the frequency of the short-circuit of the wire harness to the ground, the time period of the short-circuit, the position of the short-circuit and its importance, and sets the condition for the cut-off of the power source. Therefore, it is possible to take the most suitable counter-measure in accordance with the state of the ground-short.

Further, the monitor monitors the electric potential applied to the conductivity layer, and the detector detects the short-circuit of the wire harness to the ground on the basis of an output of the monitor. When the detector detects the ground-short, the alarm raises an alarm. At that time, the control system grasps the state of the ground-short from data to estimate damage by using the parameters of the frequency of the short-circuit of the wire harness to the ground, the time period of the short-circuit, the position of the short-circuit and its importance, and changes the level to raise the alarm so as to raise the most suitable alarm in accordance with the state of the ground-short.

When the abnormality conditions such as the ground-short occurs, the processing unit in charge of the group in the area where the abnormality occurred notifies the occurrence of the abnormality to a processing unit of another group, and cuts away the abnormal area to maintain safety. At that time, because the control which has been performed by the processing unit in charge is left to the processing unit of another group, the effect due to the cut-away of the abnormal area is effectively suppressed.

The multiplexing apparatus includes a terminal processing unit which performs only the processing at the associated group, and a control processing unit which performs all the processing including the processing of the terminal processing unit.

BRIEF DESCRIPTION OF THE DRAWINGS

In the drawings, like reference numerals denote like parts in the various views.

FIG. 7 is a schematic view of a connector for fixing the conductor member and connecting it the conductor wire.

FIG. 8 is a schematic view showing the structure of the wire harness to which the structure shown in FIG. 7 is applied.

FIG. 18 is a view showing the relationship between points, and place, frequency and importance in the subroutine of step S41 of FIG. 17.

PREFERRED EMBODIMENTS OF THE INVENTION

Embodiments of the present invention will be explained hereinafter with reference to the drawings.

Figure 1:
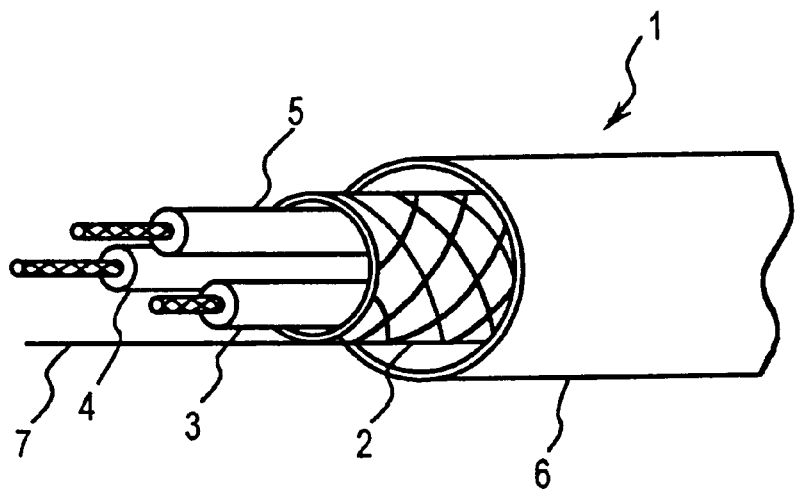
FIG. 1 is a perspective view showing the configuration of a wire harness used in an embodiment of the present invention.

FIG. 1 shows the structure of a wire harness according to the present invention. Electric wires 3, 4 and 5 are covered with an insulating layer, and further covered with an electric conductor member 2 for the detection of a short circuit. The wire harness 1 is formed by covering the outside of the conductor member 2 with an insulating member 6. The insulating member 6 protects the conductor member 2 for the detection of short-circuits and the electric wires 3, 4, 5, and ties them together in a bundle. In addition, the insulating member 6 protects the conductor member 2 from short-circuiting to the ground of a vehicle. An electric conductor wire 7 is provided for the connection to external equipment. The wire harness according to this embodiment has the structure substantially identical to a three-core shield wire. Therefore, in this embodiment, the electric wires 3, 4, 5 function as electric conductivity means, and one of three electric wires acts as an electrical communication wire. Further, the conductor member 2 for the detection of short-circuit functions as an electric conductivity layer and the insulating member 6 functions as an electrically insulating layer.

Figure 2:
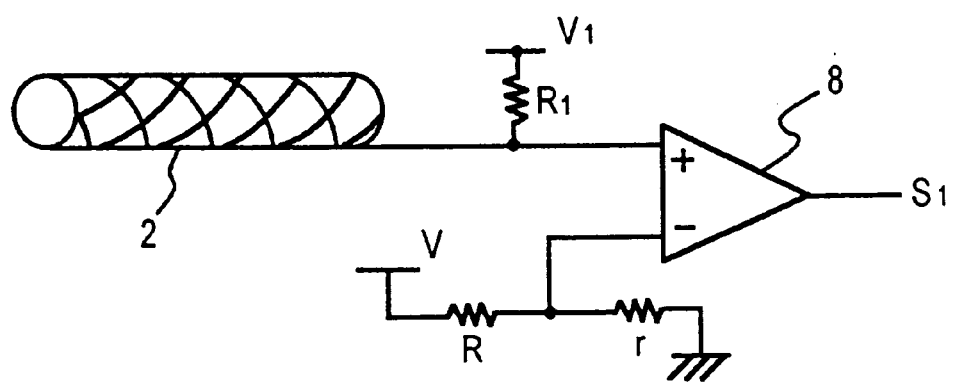
FIG. 2 is a circuit diagram showing a short-circuit detecting circuit using the wire harness shown in FIG. 1.

FIG. 2 shows an example of a short-circuit detecting circuit. In FIG. 2, an electric potential is applied through a pull-up resistor R1 to the conductor member 2 for the detection of a short-circuit connected to a + (plus or positive) terminal of a comparator 8. The voltage divided by resistors R and r is applied to a − (minus or negative) terminal of the comparator 8.

$$v = V \cdot r / (R+r) \tag{1}$$

An output S1 of the comparator 8 indicates a high level when the short-circuit detecting conductor member 2 is at a normal state, or when it is not short-circuited to the ground. While, the output S1 indicates a low level when the conductor member 2 is short-circuited to the ground, for example, due to the damage of the insulating member 6. It is, therefore, possible to detect the short-circuit of the wire harness to the ground by monitoring the output of the comparator 8. In this embodiment, the pull-up resistor R1 acts as a device for applying an electric potential to the electric conductivity layer, and the comparator acts as a monitor for the electric potential.

Figure 3:
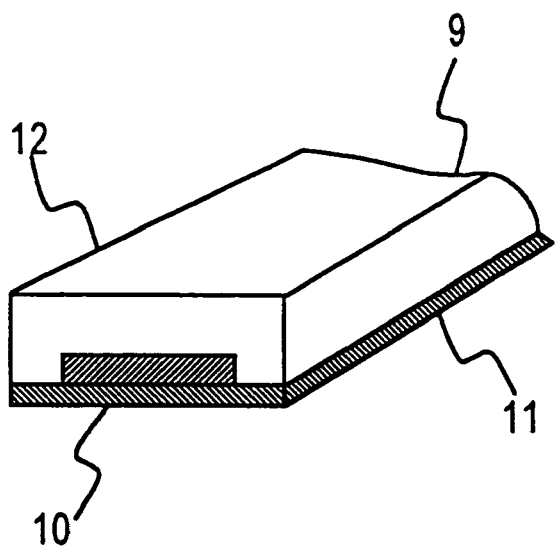
FIG. 3 is a perspective view showing a tape formed by a conductor member for detecting the short-circuit and an insulator member used in another embodiment of the present invention.

FIG. 3 shows another embodiment of the wire harness according to the present invention, which shows in detail a portion of the short-circuit detecting conductor member and the insulating member. The insulating member 9 is made of a flexible member such as a vinyl tape, inside of which a conductor member 10 is embedded. An adhesive agent 11, in addition to the insulating member 9 and the conductor member 10, forms a tape 12 wound around the wire harness. By forming the wire harness in such a way, it becomes easy to detect the short-circuit, because the electric potential of the conductor member 10 drops to the ground potential when the ground-short occurs by the breakage due to the rubbing of the insulating member 9.

Figure 4:
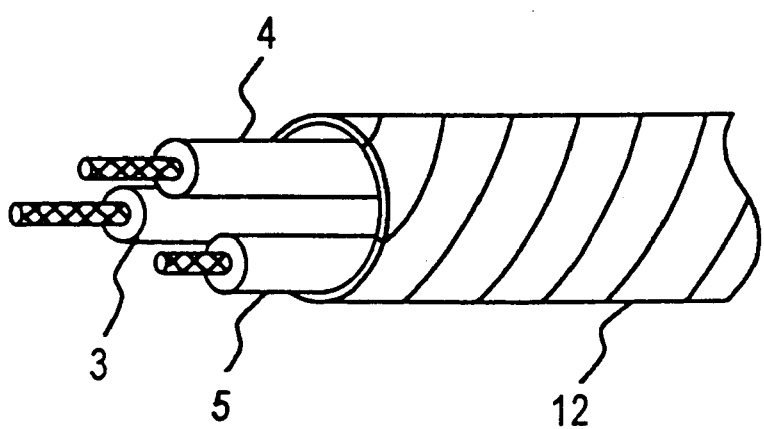
FIG. 4 is a perspective view showing the structure of the wire harness in which the tape shown in FIG. 3 is wound around electric conductor wires.

FIG. 4 shows the structure of the wire harness in which the tape 12 shown in FIG. 3 is wound around the conductor wires 3, 4 and 5. The short-circuit detecting circuit has the same construction as that shown in FIG. 2. The winding of the tape 12 may be overlapped, or may not be overlapped.

Figures 5A, 5B:
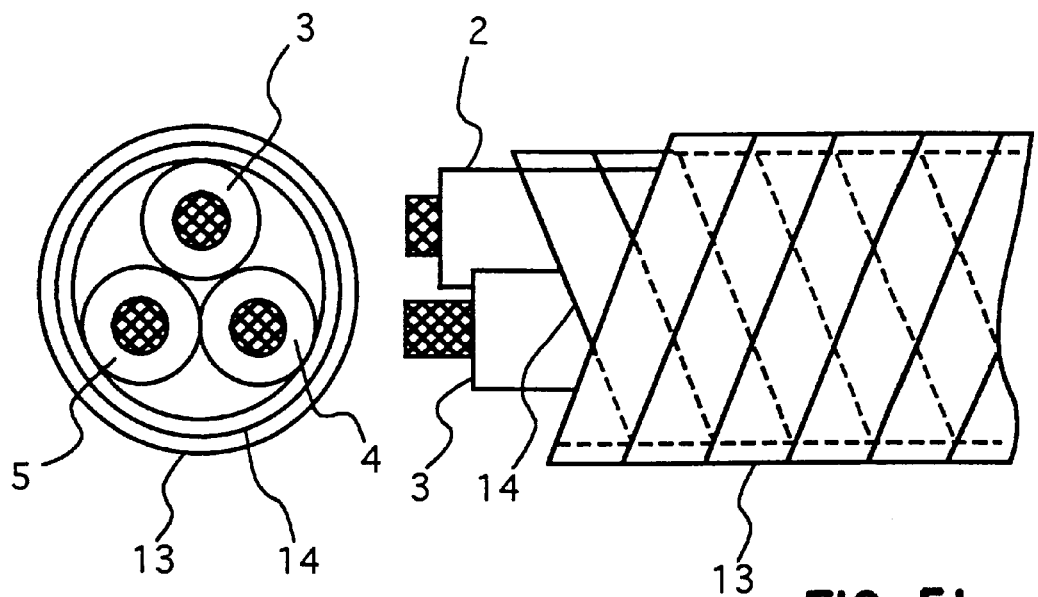
FIG. 5 is a view showing the structure of the conductor member for detecting the short-circuit and an insulator member used in a further embodiment of the present invention.

FIG. 5 shows a further embodiment of the present invention, which shows the structure of the conductor member for detecting the short-circuit and the insulator member. In FIG. 5, the insulator member 13 is made of a flexible insulating member such as a vinyl tape. A conductor member 14 inside of the insulator member 13 is made of a flexible conductivity member such as an aluminum tape. The electric wires 3, 4, 5 are covered in order by the conductor member 14 and the insulating member 13 thereon. Further, there is no problem even if a different conductor or insulating member is provided between the electric wires 3, 4, 5 and the conductor member 14. The short-circuit detecting circuit has the same construction as that shown in FIG. 2.

Figures 6A, 6B:
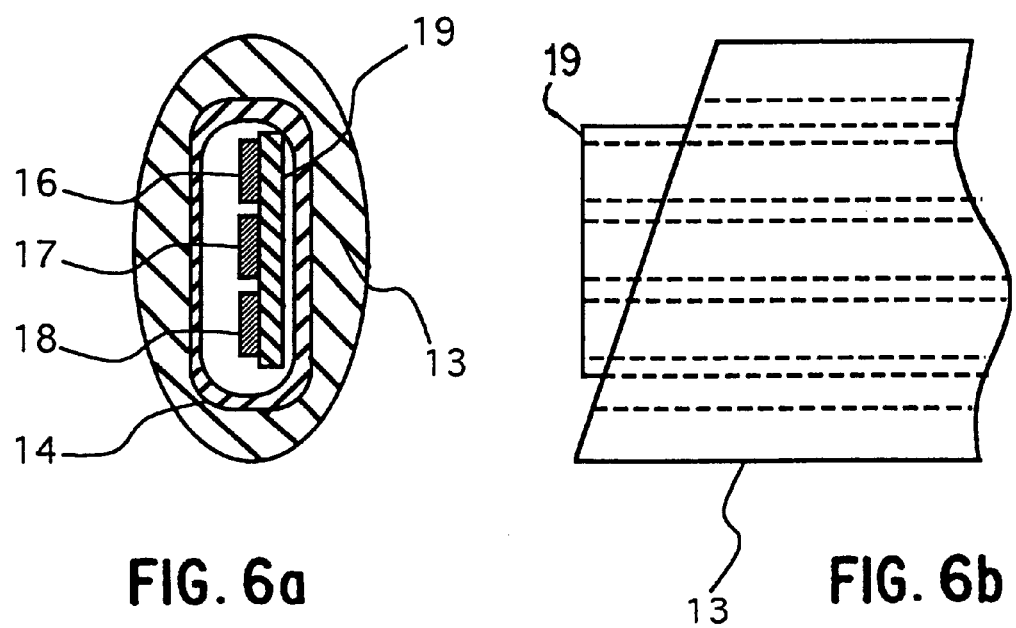
FIG. 6 is a view showing the structure of the conductor member for detecting the short-circuit and an insulator member used in a further embodiment of the present invention.

FIG. 6 shows the structure of the conductor member for detecting the short-circuit and insulator member used in a further embodiment of the present invention. In FIG. 6, the insulator member 13 is made of a flexible insulating member such as a vinyl tape. The conductor member 14 inside of the insulator member 13 is made of a flexible conductivity member such as an aluminum tape. The electric wires 16, 17, 18 are covered in order by the conductor member 14 and the insulating member 13 thereon. In this embodiment, the electric wires 16, 17, 18 are printed on a flexible substrate 19. The short-circuit detecting circuit has the same construction as that shown in FIG. 2.

FIG. 7 shows a connector for fixing the conductor member 14 and connecting it to the conductor wire 7. As shown in FIG. 7, the connector 15 has a structure such that the conductor wire 7 is connected to a ring-shaped conductor member 20 with a partially cut-away portion 20a.

FIG. 8 shows the construction of the wire harness to which the connector 15 shown in FIG. 7 is applied. In FIG. 8, the connector 15 is made by attaching and swaging the ring-shaped conductor member 20 around the conductor member 14 of the wire harness 1, thereby holding a sufficient connection between the wire harness and the conductor member 20. The partially cut-away portion 20a is provided to ensure the margin for swaging. The connection provides the conductivity between the conductor member inside the insulating member 13 and the conductor member 20 of the connector 15. Thereby, the electric potential is applied to the conductor member 14 through the conductor wire 7 connected to the conductor member 20. Further, the connector 15 also acts to bind the electric wires 3, 4, 5 and the conductor member 14.

Figure 9:
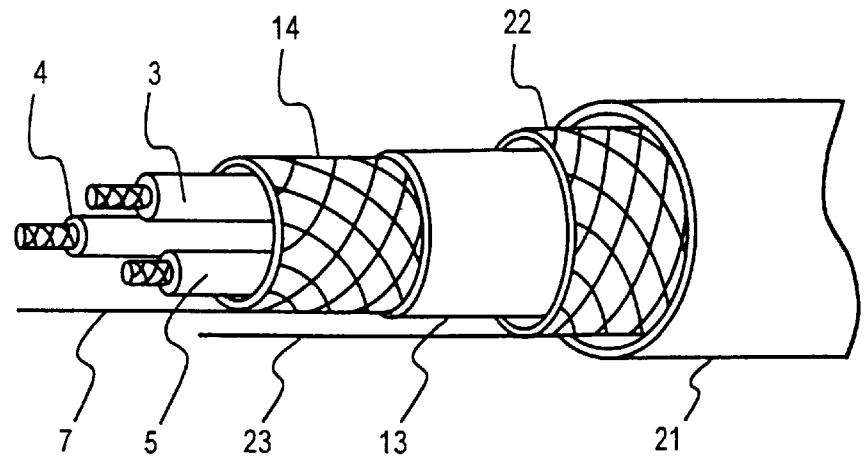
FIG. 9 is a perspective view showing the structure of the wire harness which has a double structure made of the conductor member and the insulator member.

FIG. 9 shows the structure of the wire harness which has a double structure made of the conductor member and the insulator member. A first insulating member 21 at the outermost periphery of the wire harness is used for protecting the whole wire harness. While a first conductor member 22 in the outer periphery is used as a detector for the ground-short of the wire harness, only alarm is raised even if the conductor member 22 short-circuits, because a second conductor member 14 and a second insulating member inside the first conductor member are provided. A conductor wire 23 is used for applying an electric potential to the first conductor member 22. If the second insulating member 13 suffers damage after the damage of the first conductor member 22, and the second conductor member 14 short-circuits to the ground, the inside wires 3, 4, 5 may suffer damage in a short time. Therefore, the driver is alerted to the abnormality in another way apart from the alarm. The conductor wire 7 is used for applying an electric potential to the second conductor member 14. While in this example the conductor members and the insulating members are combined in double, it is possible to combine them more than double layers.

Figure 10:
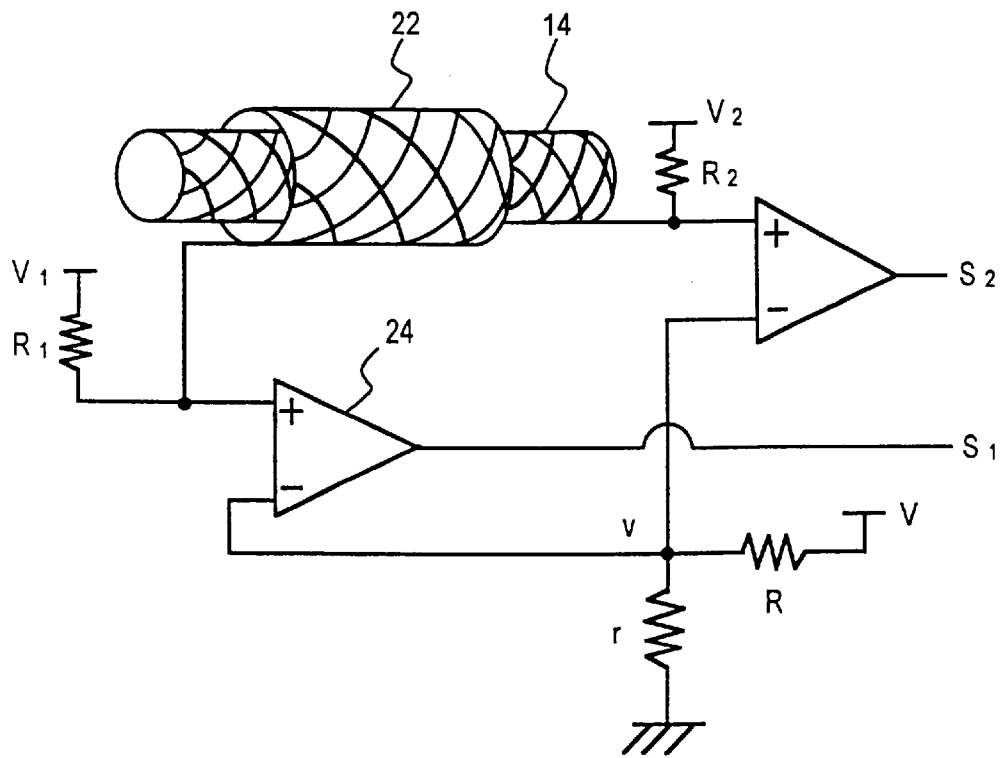
FIG. 10 is a circuit diagram showing the short-circuit detecting circuit using the wire harness with the structure shown in FIG. 9.

FIG. 10 shows the short-circuit detecting circuit using the wire harness with the structure shown in FIG. 9. In FIG. 10, an electric potential V1 is applied through a pull-up resistor R1 to the first conductor member 22 connected to a + (plus) terminal of a comparator 24. As described with respect to the equation (1), the voltage divided by resistors R and r is applied to a − (minus) terminal of the comparator 24. An output S1 of the comparator 24 indicates a high level when the first conductor member 22 is at a normal state, or when it is not short-circuited to the ground. While, the output S1 indicates a low level when the first conductor member 22 is short-circuited to the ground, for example, due to damage of the insulating member of the first conductor member 22.

Further, an electric potential V2 is applied through a pull-up resistor R2 to the second conductor member 14 connected to a + (plus) terminal of a comparator 25. As described with respect to equation (1), the voltage obtained by dividing the voltage V by resistors R and r is applied to a − (minus) terminal of the comparator 25. An output S2 of the comparator 24 indicates the high level when the second conductor member 14 is at a normal state, or when it is not short-circuited to the ground. While, the output S1 indicates the low level when the second conductor member 14 is short-circuited to the ground, for example, due to the damage of the insulating member of the second conductor member 14.

It is, therefore, possible to detect the ground-short of the wire harness including its risk by monitoring the outputs of the comparators 24 and 25.

Figure 11:
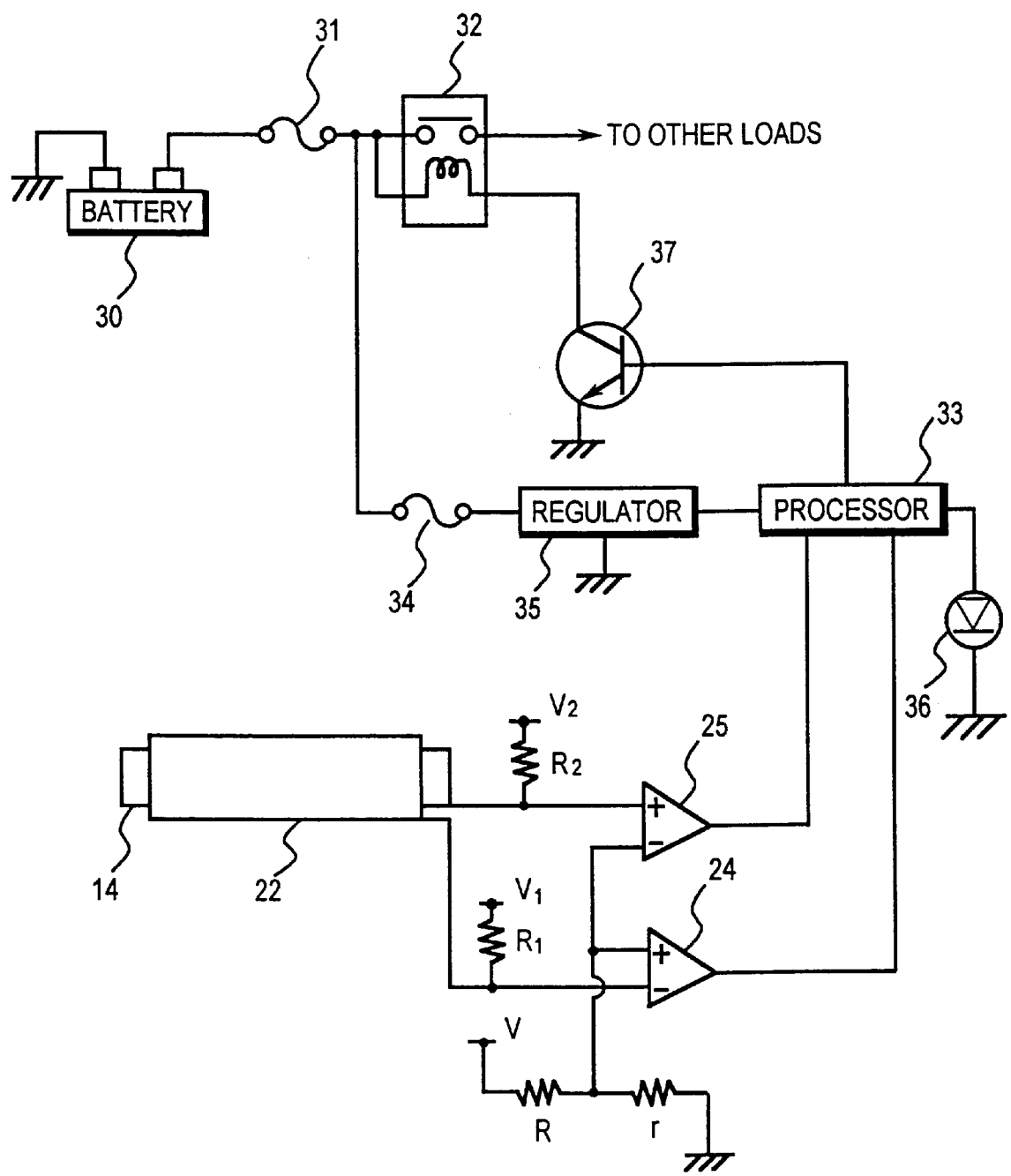
FIG. 11 is a circuit diagram showing an example of an alarm system for ground-short using the wire harness with the structure shown in FIG. 9.

FIG. 11 is a circuit diagram showing an example of an alarm system for a ground-short using the double-layer type wire harness with the structure shown in FIG. 9. In FIG. 11, a current from the power source is supplied from a − (minus) terminal of the battery through link 31 and emergency cutoff relay 32 to other loads. The current from the power source is also supplied through a fuse 34 and a regulator 35 to the control system or a processor 33. The short-circuit of the first conductor member 22 is detected by the first comparator 24, and the short-circuit of the second member 14 is detected by the second comparator 25. Outputs of those comparators are input to the processor 33. The processor 33 processes the outputs according to the procedure shown in FIG. 12, and determines the risk of short-circuit. Namely, when the first conductor member 22 is short-circuited, an alarm lamp is lighted and caution is given to a driver. When the second conductor member 14 is short-circuited, it is determined that the wire harness will become dangerous, and a driver 37 is cut off and thus the relay 32 is cut off. As a result, the whole power for the vehicle is cut off.

Figure 12:
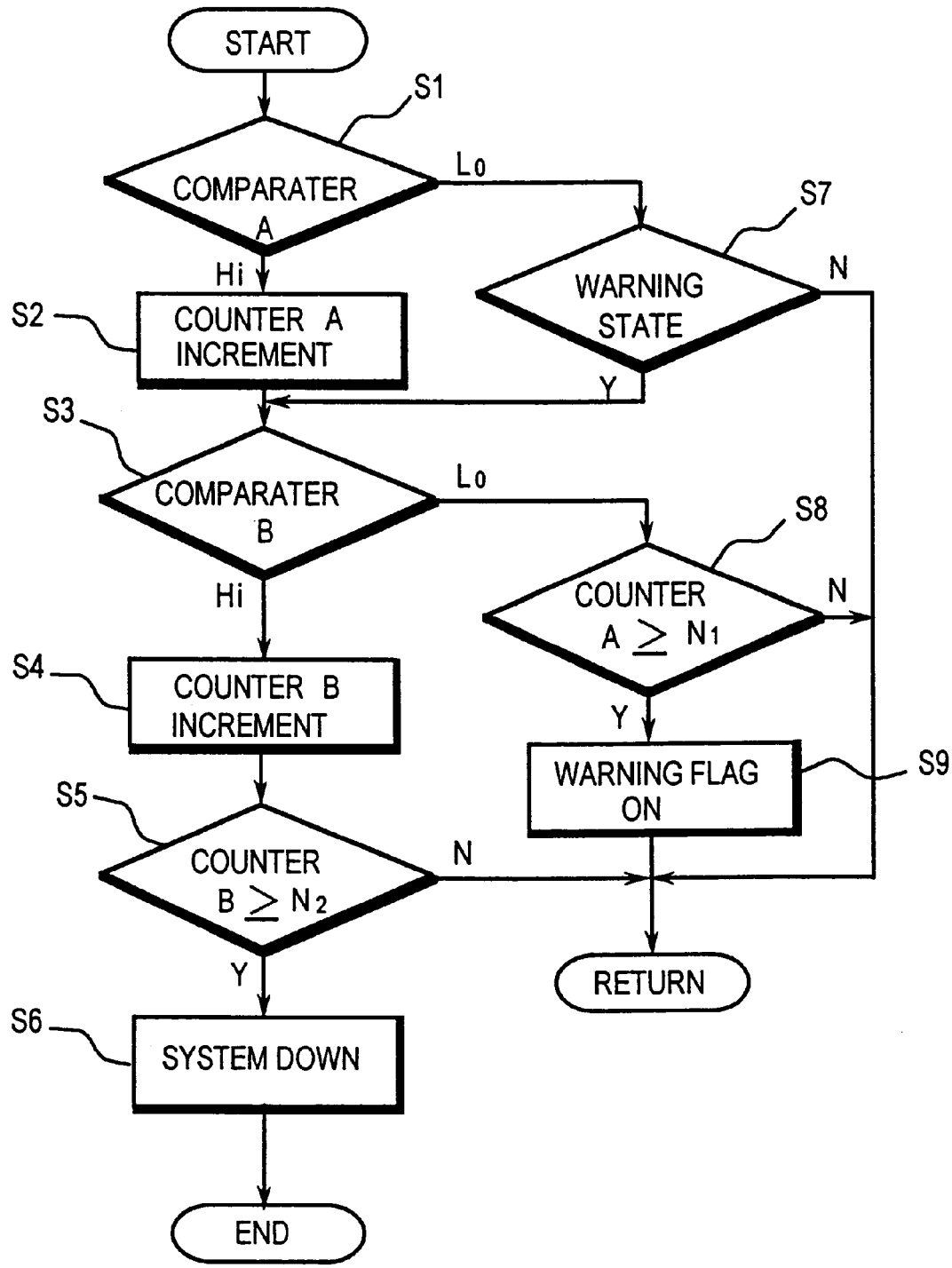
FIG. 12 is a flow chart showing the procedure of processing in the alarm system for a ground-short using the wire harness with the structure shown in FIG. 9.

Referring now to FIG. 12, FIG. 12 is a flow chart showing the procedure of processing in the alarm system for ground-short using the wire harness with the double-layer structure shown in FIG. 9. In step S1, an output of the first comparator (A) 24 is checked, which detects the short-circuit of the first conductor member 22. If the output is at the low level, then the processing advances to step S7. In step S3, an output of the second comparator (B) 25 is checked, which detects the short-circuit of the second conductor member 14. If the output is at the high level, then it is determined that the wire harness is short-circuited, and a counter B for the detection of the short-circuit of the first conductor member 14 is incremented in step S4. If the output is at the low level, then the process advances to step S5. In step S5, the value of the counter B is compared with the predetermined threshold value N2. If the value of the counter B is equal to or larger than the predetermined threshold value N2, then it is determined that the short-circuit of the second conductor is deteriorated. In step S6, a main relay 32 for the power source is cut off and the system is shut down. While, if the value of the counter B is smaller than the predetermined threshold value N2, then the process returns to START.

Further, if the output of the second comparator (B) is at the low level in step S3, then the value of the counter (A) is compared with the predetermined threshold value N1 in step S8. In this case, if the value of the counter (A) is equal to or larger than the value N1, then it is determined that the short-circuit of the first conductor 22 is deteriorated. In step S9, a warning flag is indicated and the alarm lamp is lighted. If the value of the counter (A) is smaller than the value N1, then the process is returned to START. In step S7, it is checked whether or not the first conductor member 22 is short-circuited. If the first conductor member 22 has already been short-circuited, then the process advances to step S3, and if it has not been short-circuited, then the process returns to START.

Figure 13:
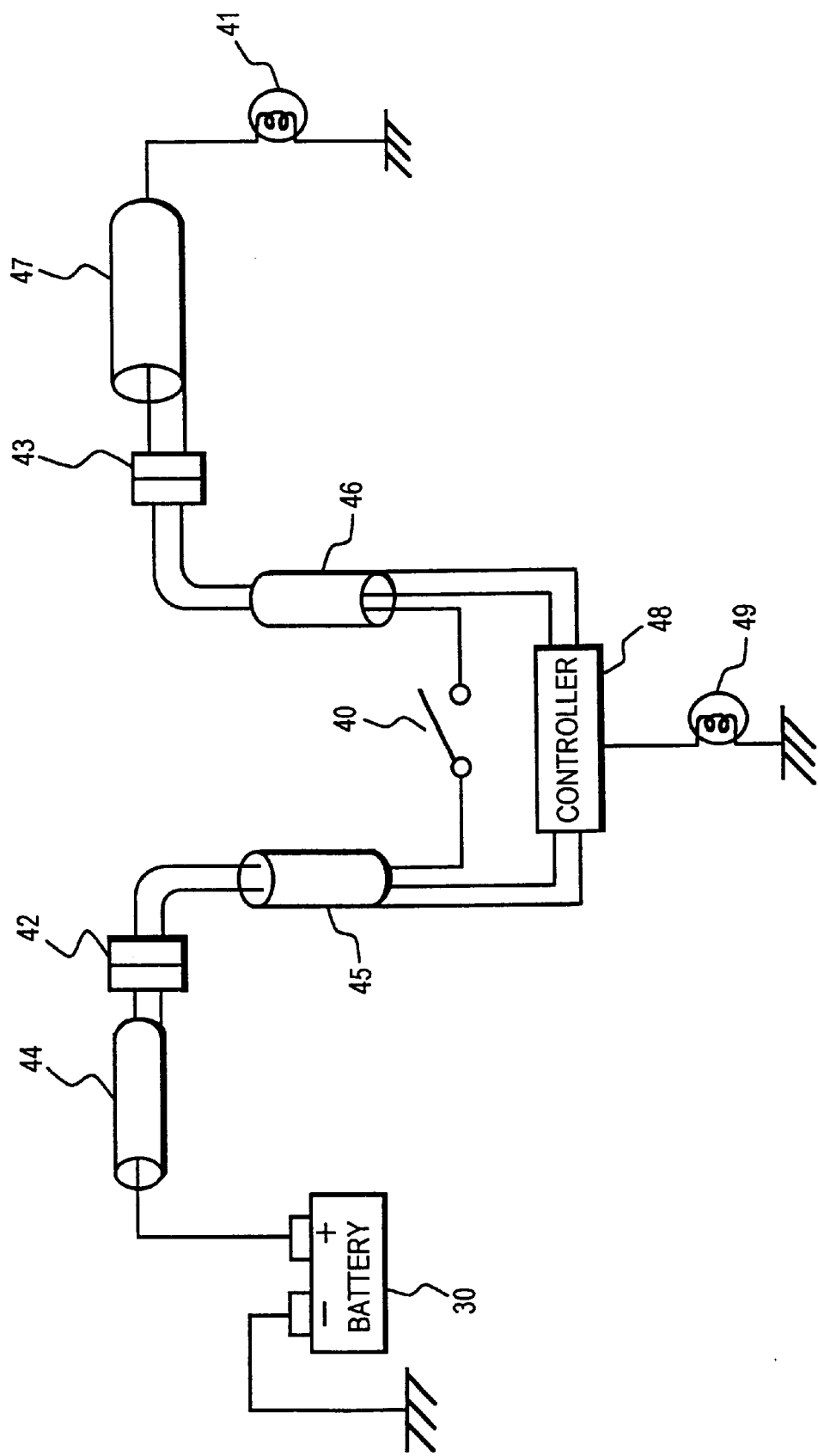
FIG. 13 is a circuit diagram showing a lighting circuit for an on-board lamp using the wire harness with the function of detection of the short-circuit used in the present invention.

FIG. 13 shows a lighting circuit for an on-board lamp using the wire harness with the function of detection of the short-circuit used in the present invention. A current from the battery 30 is controlled by a switch 40 and a lamp load 41 is turned on or off. Wires are connected through connectors 42 and 43. Short-circuit detecting conductor members 44, 45, 46, 47 are connected between the battery 30 and the connector 42, between the connector 42 and the controller 48, between the controller 48 and the connector 43, and between the connector 43 and the lamp 41, respectively. Namely, the conductor members 44 to 47 are electrically connected to a single controller (control system) 48. When each of the short-circuit detecting conductor members is short-circuited over the predetermined times, the alarm is raised by an alarm lamp 49 connected to the controller 48.

Figure 14:
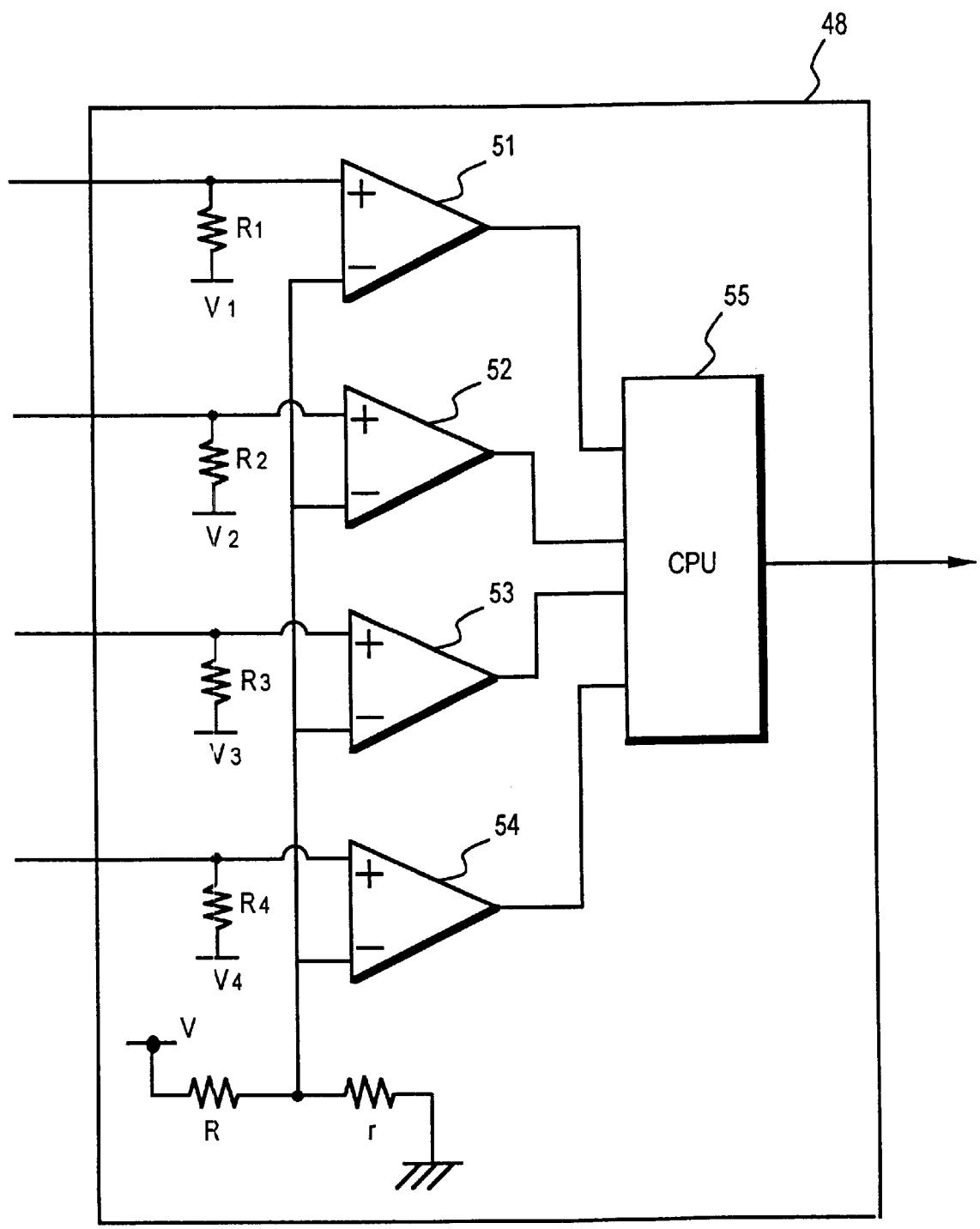
FIG. 14 is a circuit diagram showing the internal construction of a controller shown in FIG. 13.

FIG. 14 shows the internal construction of the controller shown in FIG. 13. In the controller 48, there are provided comparators 51 to 54 in the controller 48, which check output voltages of the short-circuit detecting conductor members 44 to 47. When the wire harnesses are not short-circuited, voltages V1 to V4 are applied through pull-up resistors R1 to R4 to + (plus) input terminals of the comparators 51 to 54, respectively. An electric potential of the plus input terminal is at ground when the wire harnesses are short-circuited. The voltage obtained by dividing a voltage V by using resistors R and r as shown in the equation (1) is applied to − (minus) input terminal. An output of each of the comparators is input to a CPU 55. When the output at the high level occurs over the predetermined times, it is assumed that the conductor member is short-circuited to the ground. As a result, the alarm lamp is lighted.

Figure 15:
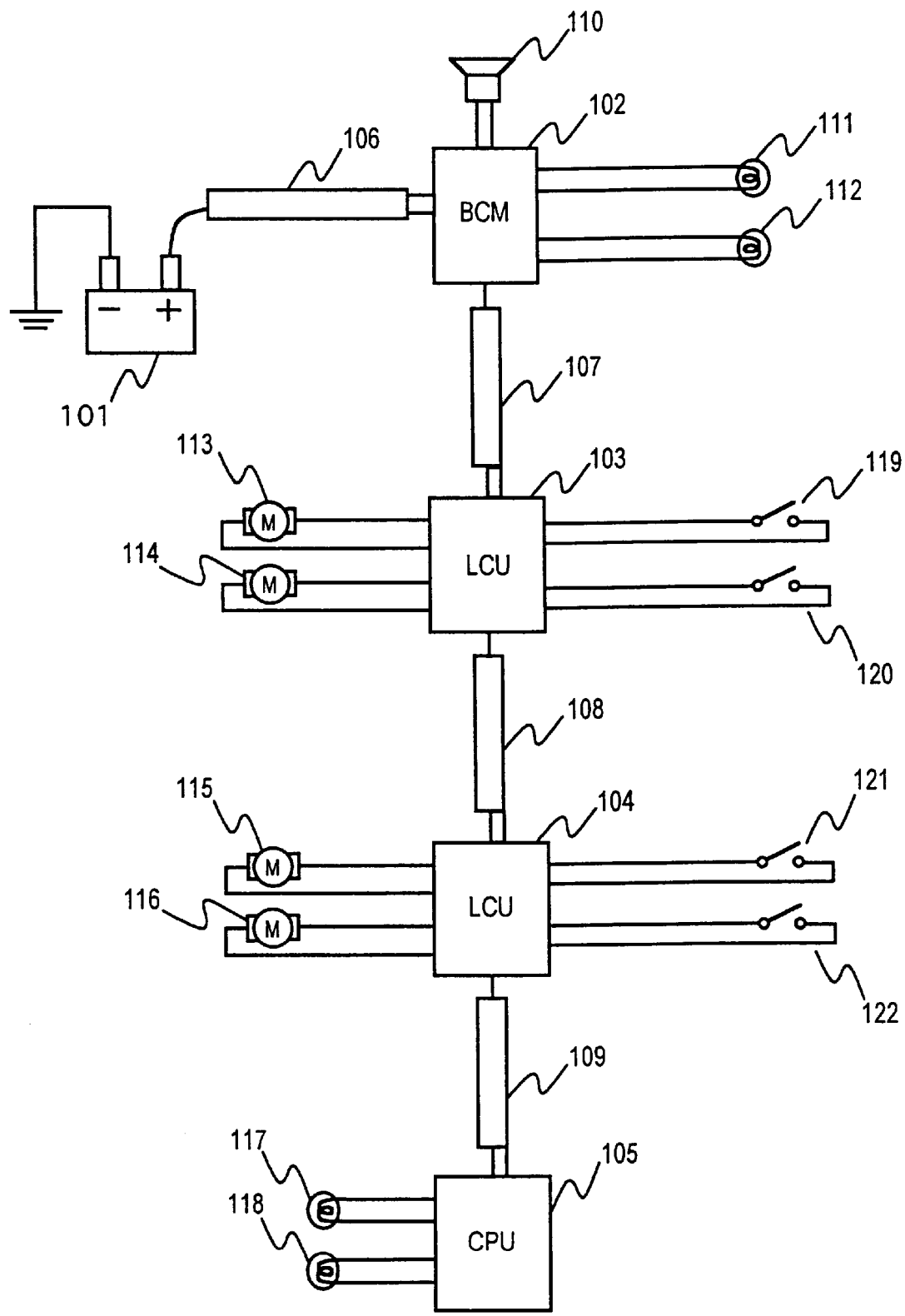
FIG. 15 is a block diagram showing an example in which the wire harness with the function of detection of the short-circuit is applied to a multiplex communication system used in a vehicle (In-vehicle LAN).

FIG. 15 is a block diagram showing an example in which the wire harness with the function of detection of the short-circuit is applied to a multiplex communication system used in a vehicle (hereinafter, referred to as an In-vehicle LAN). The In-vehicle LAN comprises one BCM (Body Control Module—control processing unit) 102, a first, a second and a third LCU (Local Control Unit —terminal processing unit) 103, 104, 105, a first, a second and a third combination cable (wire harness) 107, 108, 109, each of which is connected between the processing units, a fourth combination cable 106, and a battery 101 connected through the fourth combination cable 106 to the BCM 102. This In-Vehicle LAN system is a so-called "central control" type of In-Vehicle LAN.

A buzzer 110 and a first and a second lamp 111, 112 are connected to a BCM 102. A power cable (the fourth combination cable) connected between the battery 101 and the control processing unit BCM 102 is constructed as a combination cable of a communication wire and a short-circuit detecting wire harness.

The first LCU 103 is connected through the first combination cable 107 to the BCM 102. The first LCU 103 is also connected to a first and a second motor 113, 114, and a first and a second operating switch 119, 120 each for operating these motors 113, 114. The second LCU 104 is connected through the second combination cable 108 to the first LCU 103. The second LCU 104 is also connected to a third and a fourth motor 115, 116, and a third and a fourth operating switch 121, 122. The third LCU 105 is connected through the first combination cable 109 to the second LCU 104. The third LCU 105 is also connected to a third and a fourth lamp 117, 118.

The BCM 102 transmits and receives data through combination cables to and from the first LCU 103 and the third LCU 105, and outputs a command signal to control an actuator connected to each of LCUs 103 to 105 on the basis of information obtained from the first, the second, and the third LCUs 103, 104, 105 through electrical communication.

There are provided the first to the fourth operation ~wit~h~s 119 to 122 the buzzer 110, the first to the fourth lamps 111, 112, 117, 118, the first to the fourth motors 113 to 116 in the neighborhood of a plurality of electric equipments in the system. They are connected to any one of the first to the third LCUs 103 to 105 and the BCU 102. Further, the short-circuit detecting circuits or the combination cables 106 to 109 are incorporated in the BCU and the LCUs 103 to 105. The BCM 102 detects the short-circuit of the fourth combination cable, the first LCU 103 the first combination cable, the second LCU 104 the second combination cable, and the third LCU 105 the third combination cable.

A brief explanation of a series of data transmissions will be given next. When the BCM 102 transmits a certain data to an LCU, the LCU which received the data answers the input data itself back to the BCU. Therefore, first, a data transmission signal directed from the BCU 102 to any one of the LCUs 103 to 105 appears in a communication wire of the combination cable, and then a data reception signal directed from any one of the LCUs 103 to 105 to the BCM 102 appears in the same communication wire. A set of transmission and reception signals as described above are supplied to other LCUs in the same way. The data answered to the LCU 103 to 105 is input to a self-contained load control unit, and operates actuators such as the motors 113 to 116. Further, signals indicative of the state of various operating switches 119 to 122 are answered to the BCM 102, which the LCUs 103 to 105 input. These signals indicate the required operation.

Figures 16A, 16B:
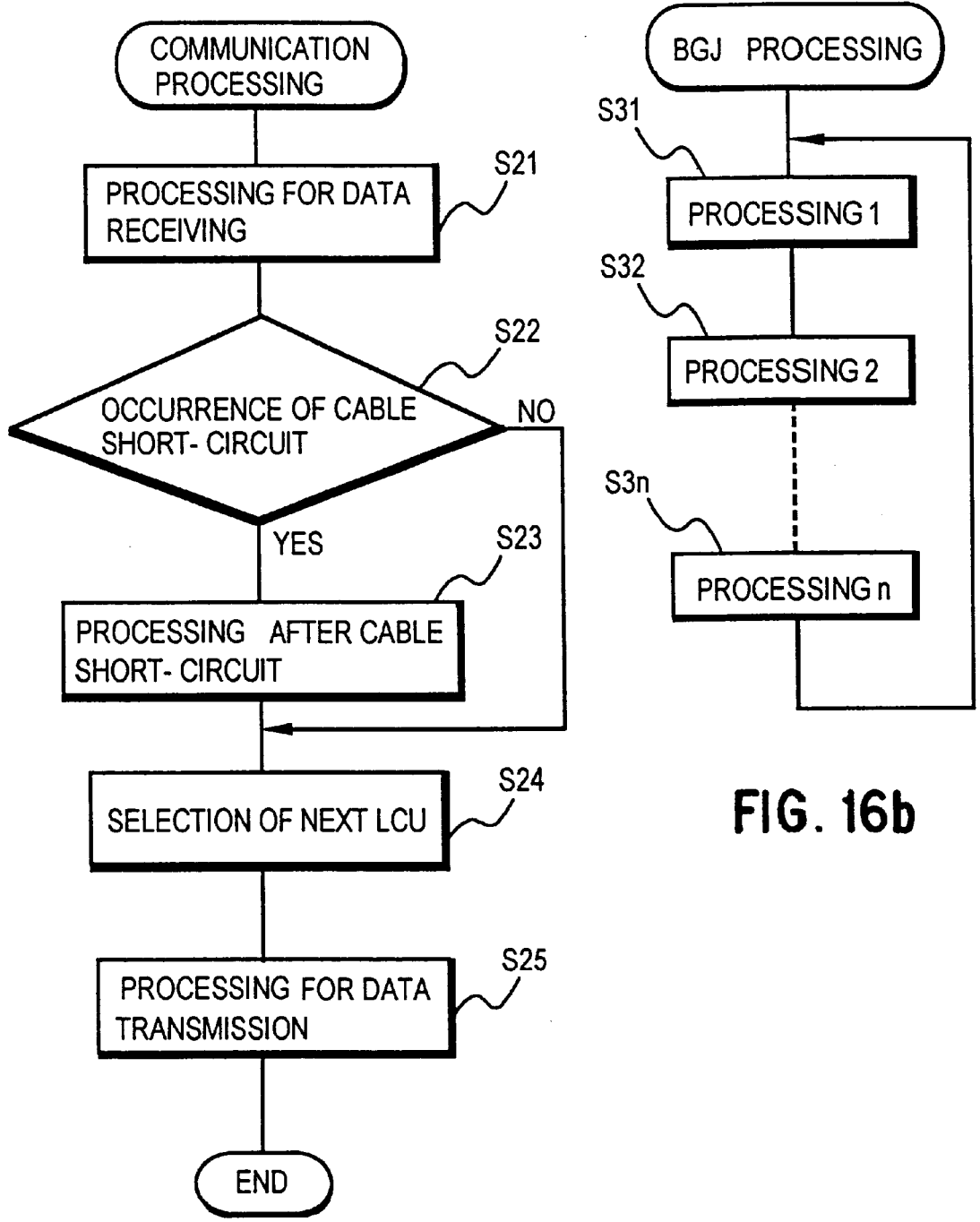
FIG. 16 is a flow chart showing the procedure of communication processing in an In-vehicle LAN shown in FIG. 15.

FIG. 16 is a flow chart showing the procedure of the whole communication processing. The communication processing shown in FIG. 16(*a*) expresses the processing steps in which the BCM 102 communicates with the LCUs 103, 104 and 105, and BGJ (Back Ground Job) shown in FIG. 16(*b*) is the assembly of processing 1 (step S31) to processing n (step S3n) to determine how to control on the basis of the reception data. The BGJ processing is endless processing performed when other processing is not performed. For example, if it is required to perform the communication processing when the processing 1 (step S31) is now performing, the communication processing is performed after the communication processing 1 (step S31) is temporarily interrupted, and the processing 1 is performed from the point where the processing 1 is interrupted before.

The communication processing is reception interruption processing performed when the reception data from the LCUs 103 to 105 reaches the BCM 102. In this processing, the data from LCUs 103, 104, 105 is first received in step S21. After that, it is checked whether or not the combination cables 106 to 109 are short-circuited in step S22. If it is determined that a short-circuit occurred in the combination cables, then the processing after the short-circuit of the cable is performed in step S23. The next LCU to be accessed is selected in step S24 and the data is transmitted to the selected LCU in step S25. While, if in step S22, it is determined that no short-circuit occurred, then the next LCU to be accessed is selected in step S24 without performing the processing after the cable short-circuit, and the processing for the data transmission is performed in step S25.

Figure 17:
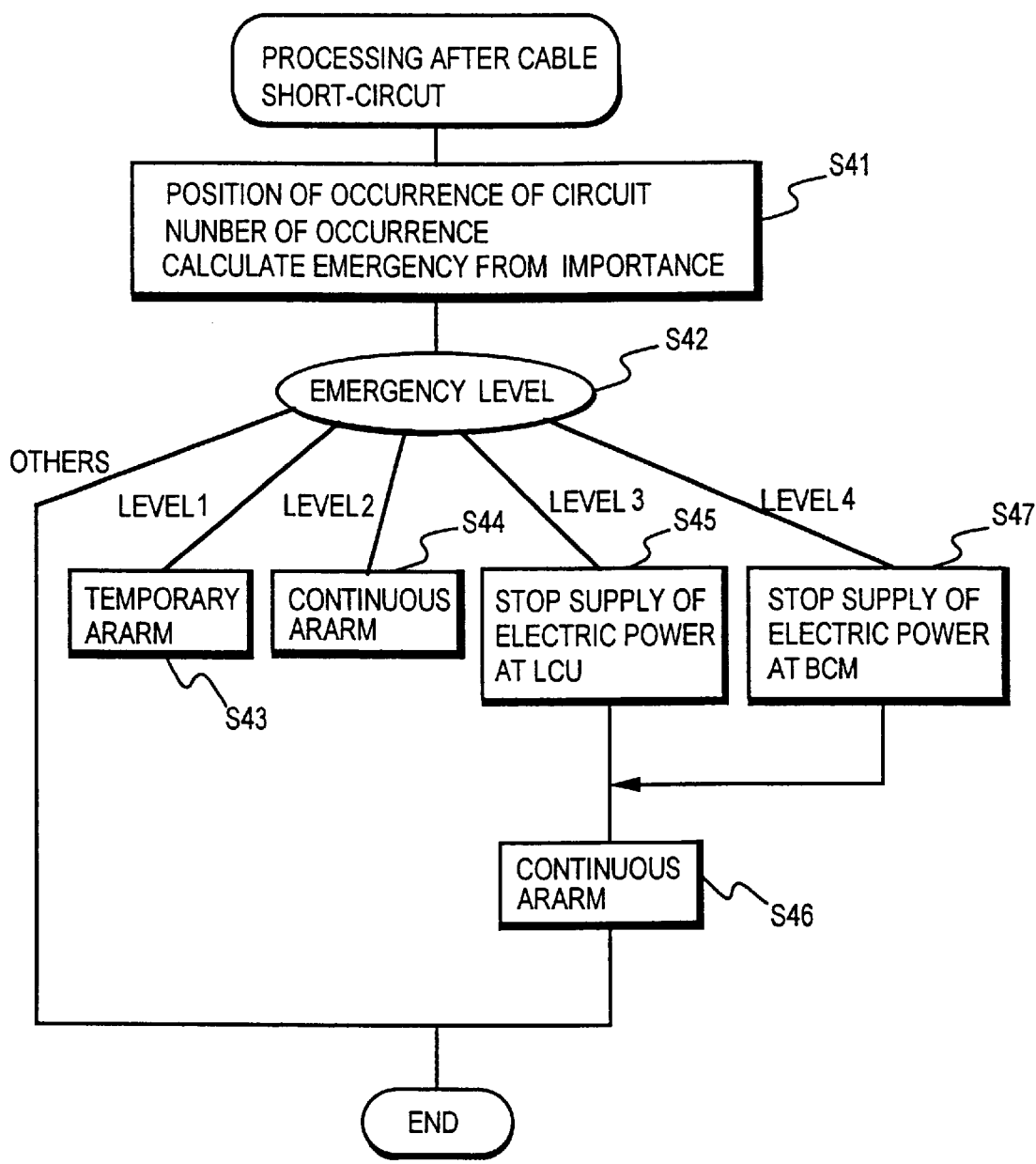
FIG. 17 is a flow chart showing the procedure of processing in a sub-routine of the processing shown in FIG. 16 carried out at the time of the cable short-circuit.

FIG. 17 is a flow chart showing the procedure of processing carried out at the time of the cable short-circuit. In step S41, the position of occurrence of the short-circuit in the combination cables 106 to 109 is identified. As described above, because the BGM 102 and each of the LCUs 103 to 105 detect the short-circuit of the combination cables 106 to 109, it is possible to easily detect which combination cable is short-circuited. After the short-circuit of the combination cables is detected, the number of occurrences of the short-circuit is detected. Where, the number of occurrences per unit time is expressed as frequency. Next, the importance, that is, the extent of whether or not the failure caused by the short-circuit extends to safety components such as a head-light, is detected. These detected data are used as parameters in the calculation of points. The points are calculated by using a map as shown in FIG. 18, and the total points indicate the level of emergency. In other words, the processing in step S41 indicates the extent of the state of the currently occurring short-circuit.

When the emergency level is calculated as described above, levels 1 to 4 are selected according to the calculated level in step S42. This processing is temporary alarm processing. If the conditions with respect to the points are satisfied, or the ignition key is turned on, then the alarm indicative of these conditions is raised just once. When the total points are equal to or more than 15 and less than 20, the processing corresponding to the emergency of level 2 is performed in step S44. This processing is continuous alarm processing. In this case, the alarm is raised continuously or interruptly. Therefore, the alarm is given earlier to a driver. When the total points are equal to or more than 20 and less than 40, the processing corresponding to the emergency of level 3 is performed in step S45. In this processing, a downstream current from the power source to the LCUs 103 to 105 is cut-off upstream of the position where the short-circuit of the combination cable is occurred, and the continuous alarm is raised in step 46 in a manner similar to that of Step 44. Because the current from the power source is cut off at the position of the occurrence of the short-circuit, it becomes possible to prevent the worst condition which causes vehicle fire even if the short-circuit is deteriorated, and confirmly raise an alarm to a driver. Next, when the total points are equal to or more than 40, the processing corresponding to the emergency of level 4 is performed in step S47. This processing is performed in such a case that the short-circuit of the combination cable may occur at the position nearer the battery 101. In the level 4, the entire power source in the LAN system is cut off, thereby preventing the occurrence of fire from the short-circuit. When the total points are less than 5, no processing is performed.

By performing the processing described above, it is possible to alert a driver to the occurrence of a short circuit and further repair, and prevent the occurrence of a vehicle fire in advance, because the power source is cut off in the case where the short-circuit occurs frequently. It should be appreciated that it is possible to cut away only the cable at the position where the short-circuit occurs such that the electric power can be supplied from another circuit by using a looped combination cable. Further, the position where the short-circuit occurs can be easily known through the LAN communication. Furthermore, because the occurrence of the short-circuit is transmitted to each of the LCUs 103 to 105, at the occurrence of the short-circuit, it is possible to carry out special control processing, for example, to neglect data obtained from the position where the cable is cut away and the estimation of such data. Further, Because the LAN system grasps the conditions of operation, it is possible to detect the short-circuit of a wire harness also during driving or parking. Therefore, in case the wire harness is short-circuited due to external vibration, it is possible to instantly cut off the power source.

Figure 19A:
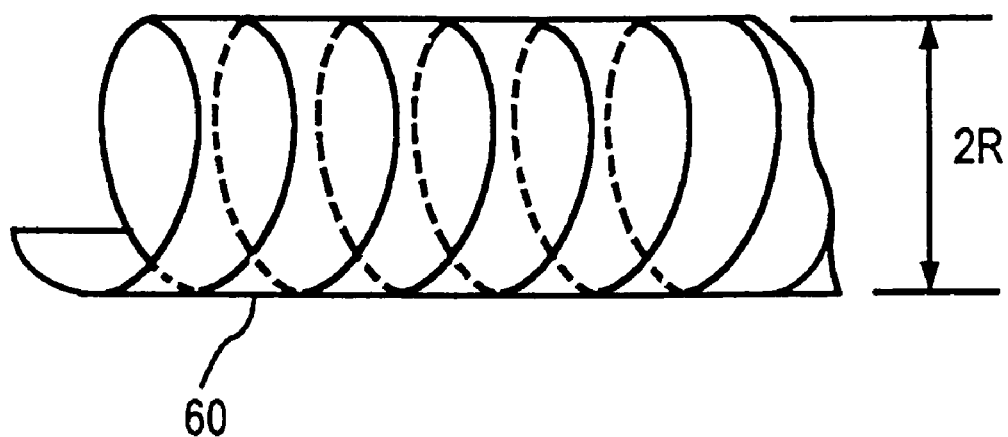
FIGS. 19a and 19b are illustrations showing an example in which the conductor member for detection of the short-circuit having a resistance value is wound on a cylindrical form.
Figure 19B:
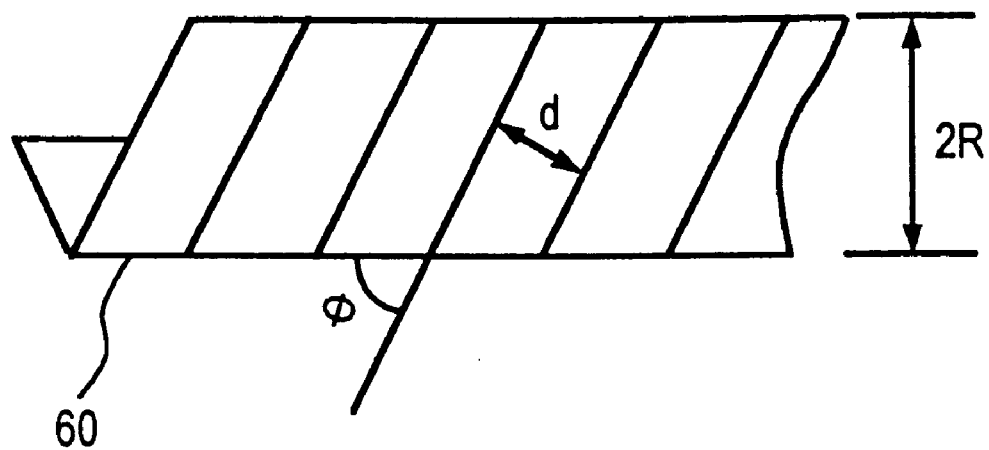

FIG. 19 is an illustration showing an example in which the conductor member 60 for detection of the short-circuit having a resistance value A ($\Omega$/m) is wound on a cylindrical body with radius R. FIG. 19(*a*) shows the form of the wounded conductor member, and FIG. 19(*b*) shows the relationship between the angle to be wound and the width of the conductor member. Assuming that the width of the conductor member is d and the conductor member is wound around without a gap, then:

$$\cos \phi = d/4R$$

Therefore, the value of the resistor R0 per one round is $$R0 = 4R \int_0^{\pi/2} \int \sqrt{(1+(\cot \phi)^2 (\sin \theta)^2)} d\theta * A$$

When the voltage V is applied to the conductor member by using the pull-up resistor R2, the electric potential Vx is:

$$Vx = V*R0*N/(R0*N+R2)$$

where, N is a turn number.

The determination of the position where the ground-short is occurred is calculated by measuring the Vx and obtaining the N.

Namely, $$N = R2/R0 * Vx/(V-Vx)$$

Accordingly, it is possible to determined the position where the ground-short is occurred.

What is claimed is:

1. An apparatus for multiplexing between processing units and a battery unit of a vehicle which are connected to one another by a wire harness, by grouping a variety of controlled on-board objects into a plurality of neighboring controlled objects and controlling each of the groups by respective processing units, in which said wire harness comprises:

electric conductors, each having an outer peripheral portion covered with a first insulating layer, electric conductivity layer which covers said electric conductors, a second insulating layer which covers the outer peripheral portion of said electric conductivity layer, means for applying an electric potential for monitoring shorting to said electric conductivity layer, and means for monitoring the electric potential of said electric conductivity layer with respect to ground variations of said electric potential indicating shorting between said electric conductivity layer and ground, whereby potential failure in said electric conductors is anticipated.

2. A multiplexing apparatus according to claim 1, wherein said electric conductivity layer is formed by a thin mesh wire.

3. A multiplexing apparatus according to claim 1, further comprising alarm means for raising an alarm to a driver, and control means for starting up said alarm means to raise the alarm.

4. A multiplexing apparatus according to claim 3, further comprising a power source circuit breaker for cutting off a current supplied from the battery unit, wherein said control means start up said power source circuit breaker to cut off the current from the battery, when said electric conductivity layer is short-circuited to the ground.

5. A multiplexing apparatus according to claim 1, wherein there are provided a plurality of electric conductivity layers between which insulating layers are alternately sandwiched.

6. A multiplexing apparatus according to claim 5, further comprising:

alarm means for raising an alarm to a driver, a power source circuit breaker for cutting off a current supplied from the battery unit, and control means for starting up said alarm means to raise the alarm and starting up the power source circuit breaker to cut off the current from the battery unit, when at least one of said electric conductivity layers is short-circuited to ground.

7. A multiplexing apparatus according to claim 1, further comprising:

means for monitoring the electric potential of said electric conductivity layer between respective groups, means for detecting the short-circuit of the electric conductivity layer to the ground on the basis of the output of said monitoring means, and circuit breaker for cutting off a current passing through said electric conductor from the power source when the short-circuit of the electric conductivity layer to the ground is detected by said detecting means, whereby potential failure of said electric conductor is anticipated.

8. A multiplexing apparatus according to claim 1, further comprising:

means for monitoring the electric potential of said electric conductivity layer between respective processing units, means for detecting the short-circuit of the electric conductivity layer to the ground on the basis of the output of said monitoring means, and alarm means for raising an alarm to a driver when the short-circuit of the electric conductivity layer to the ground is detected by said detecting means, whereby potential failure of said electric conductor is anticipated.

9. A multiplexing apparatus according to claim 4, wherein said power source cutting-off means include a switching element.

10. An apparatus for multiplexing between processing units and a battery unit of a vehicle which are connected to one another by a wire harness, by grouping a variety of controlled on-board objects into a plurality of neighboring controlled objects and controlling each of the groups by respective processing units, in which said wire harness comprises:

electric conductors, each having an outer peripheral portion covered with a first insulating layer, electric conductivity layer which covers said electric conductors, a second insulating layer which covers the outer peripheral portion of said electric conductivity layer, means for applying an electric potential for monitoring shorting to said electric conductivity layer, means for monitoring the electric potential of said electric conductivity layer with respect to ground variations of said electric potential indicating shorting between said electric conductivity layer and ground, whereby potential failure in said electric conductors is anticipated, means for monitoring the electric potential of said electric conductivity layer between respective processing units, means for detecting the short-circuit of the electric conductivity layer to the ground on the basis of the output of said monitoring means, and alarm means for raising an alarm to a driver when the short-circuit of the electric conductivity layer to the ground is detected by said detecting means, whereby potential failure of said electric conductor is anticipated;

wherein said electrical potential applying means comprise a C-shaped electric conductivity body having a portion which is notched, an electric conductor connected to the electric conductivity body for detecting an electric potential, and a pull-up resistor, and wherein said electric conductivity body is press-bonded to the electric conductor from the outside of the electric conductivity layer which is a thin mesh wire.

11. An apparatus for multiplexing between processing units and a battery unit of a vehicle coupled to one another via wire harnesses, by grouping a variety of controlled on-board objects into a plurality of neighboring controlled objects and controlling each of said groups by respective ones of said processing units, in which at least one of said wire harnesses comprises:

electrical conductors having an outer peripheral portion covered with a first insulating layer;

an electric conductivity layer covering said electrical conductors, wherein an electrical potential for monitoring shorting is applied to said electric conductivity layer;

a second insulating layer covering an outer peripheral portion of said electric conductivity layer; and an electric potential monitor operatively connected to said electric conductivity layer for detecting short circuits of said electric conductivity layer to ground, whereby a possible occurrence of a short circuit of said electric conductors is anticipated.

12. A multiplexing apparatus according to claim 11, further comprising:

an alarm circuit coupled to an alarm indicator for a vehicle driver; and a processor for activating the alarm circuit to raise the alarm indicator for the driver.

13. A multiplexing apparatus to claim 12, further comprising:

a power source circuit breaker operatively arranged so as to cut-off a current supplied from the battery unit;

wherein said processor starts up the power source circuit breaker to cut-off the current from the battery when the electric conductivity layer is short-circuited to ground.

14. A multiplexing apparatus to claim 11, wherein said electric potential monitor monitors the electric potential of the electric conductivity layer between respective groups;

a short-circuit detector coupled to the wire harness for detecting a short circuit of the electric conductivity layer to ground on a basis of an output from the monitor; and a circuit breaker for cutting-off a current passing through said electric conductor from the battery unit when the short-circuit of the electric conductivity layer is detected.

15. An apparatus for detecting a short circuit of a wire harness for a power supply used in a motor vehicle, the wire harness comprising:

electrical conductors having an outer peripheral portion covered with a first insulating layer;

an electric conductivity layer covering said electrical conductors, wherein an electrical potential for monitoring shorting is applied to said electric conductivity layer;

a second insulating layer covering an outer peripheral portion of said electric conductivity layer; and an electric potential monitor operatively connected to said electric conductivity layer for detecting shorting of said electric conductivity layer to ground, whereby a potential occurrence of a short in said electric conductor is anticipated.

* * * * *